United States Patent
Amtmann et al.

(10) Patent No.: US 7,298,369 B2
(45) Date of Patent: Nov. 20, 2007

(54) METHOD FOR DISPLAYING CALIBRATION-REQUIRED DATA

(75) Inventors: Karlheinz Amtmann, Gerhardshofen (DE); Andreas Kaszkin, Kandel (DE); Dieter Thürauf, Neuhof (DE)

(73) Assignee: Siemens Aktiengesellschaft, Munich (DE)

( * ) Notice: Subject to any disclaimer, the term of this patent is extended or adjusted under 35 U.S.C. 154(b) by 41 days.

(21) Appl. No.: 10/535,719

(22) PCT Filed: Nov. 21, 2003

(86) PCT No.: PCT/DE03/03859

§ 371 (c)(1),
(2), (4) Date: Dec. 22, 2005

(87) PCT Pub. No.: WO2004/049083

PCT Pub. Date: Jun. 10, 2004

(65) Prior Publication Data

US 2006/0149488 A1 Jul. 6, 2006

(30) Foreign Application Priority Data

Nov. 22, 2002 (DE) ................................ 102 54 629

(51) Int. Cl.
*G06T 15/00* (2006.01)

(52) U.S. Cl. ........................ 345/418; 345/2.1; 709/203; 709/208; 700/11; 702/85

(58) Field of Classification Search ................ 345/418, 345/2.1, 2.2; 709/203, 208–209, 217, 219; 700/11–12, 17; 702/1, 85
See application file for complete search history.

(56) References Cited

U.S. PATENT DOCUMENTS 7,162,510 B2 * 1/2007 Jammes ...................... 709/203

FOREIGN PATENT DOCUMENTS

| DE | 44 41 231 C1 | 3/1996 |
| DE | 195 09 775 A1 | 3/1996 |
| DE | 100 42 966 A1 | 3/2002 |
| WO | WO 9607958 A1 | 3/1996 |

OTHER PUBLICATIONS

Anonymous: "Software Requirements on the Basis of the Measuring Instruments Directive" Internet Article, Online, Oct. 30, 1999, Teddington, UK, URL: www.welmac.org/publications/7-1.pdf,. retrieved on Sep. 23, 2004, pp. 2-48, XP002297808.

Tilo Klesper, "Der Internet-Zugriff Aufs LON, Weltweiter Zugriff auf die Sensorik und Aktorik von Automatisierungs-Projekten", Elektronik, Franzis Verlag GMBH, Munchen, DE, vol. 47, No. 8, Apr. 14, 1998, pp. 60, 62, 64, 66-68, XP000780190.

Mukesh M. Prabhu and S.V. Raghavan, "Security in Computer Networks and Distributed Systems", Computer Communications, Elsevier Sciende Publisher BV, Amsterdam, NL, May 1, 1996, pp. 379-388, XP004052727.

\* cited by examiner

*Primary Examiner*—Phu K. Nguyen

(57) ABSTRACT

Calibration-required data displayed by an industrial visual display system, which can be configured using a predetermined configuring software and which has a standard interface for integrating additional applications. To this end, the calibration-required data are integrally protected and optionally encoded. The calibration-required data are then transmitted to the visual display system and decoded therein by an application that is integrated via the standard interface, after which they are visually displayed in a form that is different from the presentation possibilities that can be configured by the configuring software.

10 Claims, 1 Drawing Sheet

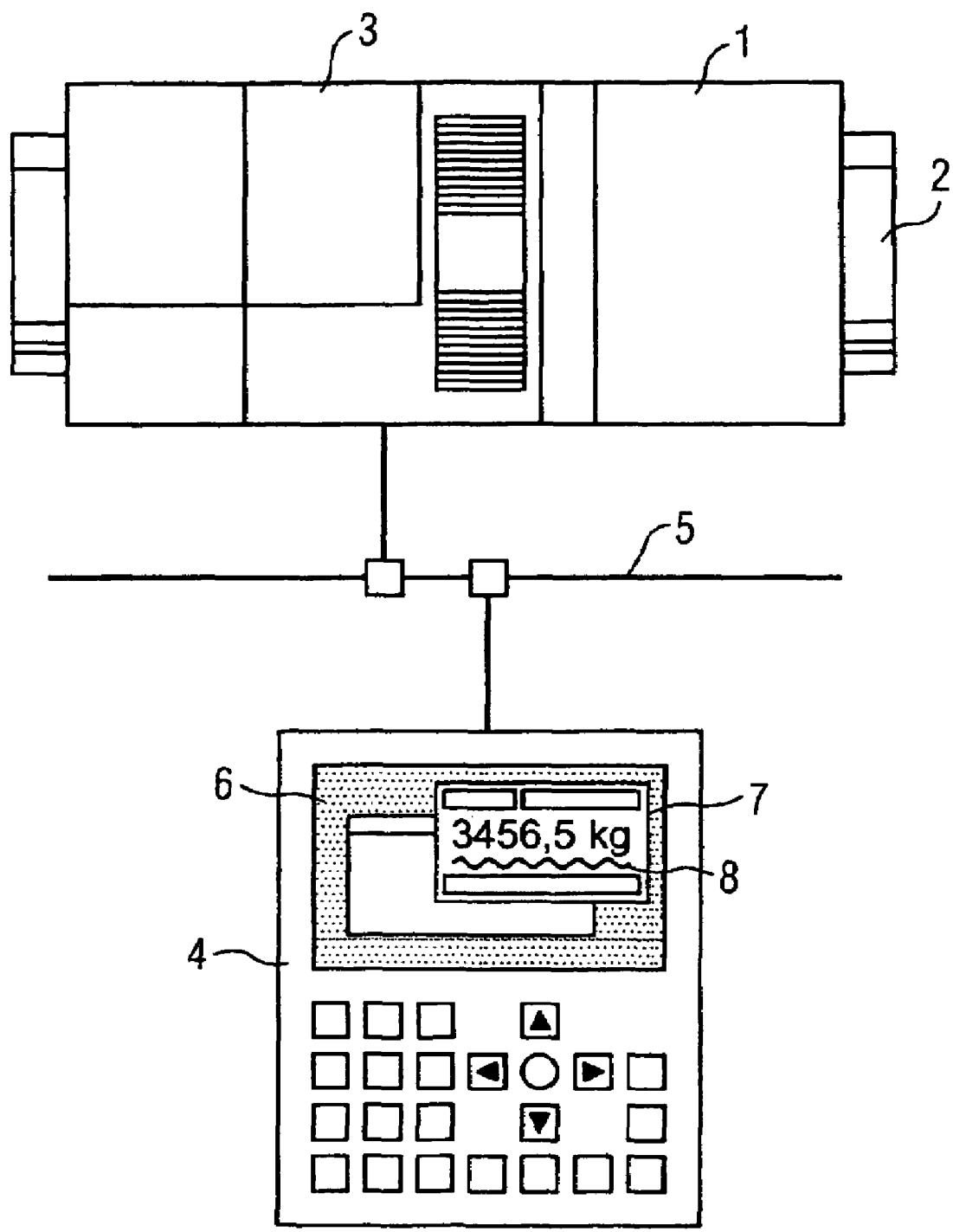

METHOD FOR DISPLAYING CALIBRATION-REQUIRED DATA

CROSS REFERENCE TO RELATED APPLICATIONS

This application is the US National Stage of International Application No. PCT/DE2003/003859, filed Nov. 21, 2003 and claims the benefit thereof. The International Application claims the benefits of German application No. 10254629.0 filed Nov. 22, 2002, both applications are incorporated by reference herein in their entirety.

FIELD OF THE INVENTION

The invention relates to a method for displaying calibration-required data.

SUMMARY OF THE INVENTION

In measurement systems in production, goods distribution or other plant measured value recorders and measured value displays are generally distributed across the plant, with the measured values or measurement data being transmitted from the measured value recorders to the measured value displays. The measurement data is increasingly displayed using freely-programmable PCs. In addition the measurement data is included as a rule for the control of the plant. By contrast with measuring devices in which the measured value recorder and the measured value display are integrated into one device, software, i.e. data transmission and processing have a prominent role to play in measurement systems. This is taken into account in the Guidelines 7.1 of the European Cooperation in Legal Metrology (WELMEC): "Software Requirements on the Basis of the Measuring Instruments Directive" dated October, 1999 (www.welmec.org/publications/7-1.pdf) in relation to the transmission and display of calibration-required data. One of the proposals in this document is that calbration-required data which is transmitted over a non-encapsulated transmission path, for example a network, should be encrypted to protect it from manipulation. To ensure the authenticity of the data when it is received, the address of the relevant sender can be transmitted together with the data. Additionally combining the calibration-required data to be transmitted with a time stamp enables the currency of the data to be checked on receipt. In relation to the display of the calibration-required data on a PC with a Windows interface there is a requirement for the data to be presented in a window which is automatically always moved into the foreground and cannot be covered by other windows, for the calibration-required data to be presented in the window in a form which cannot be confused with the other windows, and for the window which displays the calibration-required data to be administered by a calibration-required part of the program, that is a part of the program protected from deliberate changes by means of widely-used software tools (text editors).

The object of the invention is to specify a predictable method for displaying calibration-required data which satisfies the above-mentioned WELMEC requirements.

In accordance with the invention the object is achieved by displaying the calibration-required data by means of an industry visualization system which can be planned using predetermined project planning software and has a standard interface to incorporate further applications, with the calibration-required data being transmitted to the visualization system with its integrity ensured and being visualized via one of the applications incorporated into the standard interface in a way other than that provided by the presentation options able to be planned via the project-planning software.

Industry visualization system here is taken to mean an operation and monitoring device or HMI (Human Machine Interface) device as is used in particular in process automation systems. Functions, switches or process values are visualized on a so-called operator or touch panel. With the aid of this visualization processes, error messages or process values can be displayed in an easy-to-understand way to the viewer. Recording the processes visually, for example in the form of process images, makes operation easier for the user. The visualization system can be connected via a data connection to the process automation system and allows project-specific function keys, buttons or display elements to be used to influence the project. The visualization system is planned using prespecified project planning software which enables ideas to be converted simply and rapidly into simple and easy-to-understand images for the visualization system without the user having to have any specific program knowledge to perform these operations. To allow an open visualization system to be achieved while retaining ease of project planning, this system has one or more standard interfaces. Examples are for graphics import of BMP, WMF, TIF images, for data exchange DDE, ODBC, RAS and for the Integration of applications OLE and ActiveX. These interfaces provide a simple method of exchanging data between individual software products. ActiveX for example (previously also known as OCX-OLE Custom Control) allows ready-made application components to be incorporated into another application, for example into a visualization system. Process visualization can thus be enriched by functionalities for which there is no provision in the project planning software. The method in accordance with the invention advantageously uses a standard interface of an industry visualization system, allowing an application to be incorporated into the visualization system via this interface with which the calibration-required data with ensured integrity can be visualized in a form complying with the WELMEC guidelines.

If the calibration-required data is transmitted within a plant which counts as closed, safeguarding its integrity can be sufficient to meet the WELMEC requirements. If the transmission path, as in telephone networks for example, is to be regarded as open, encryption of the calibration-required data to be transmitted is necessary. In this case the encrypted data is decrypted in the visualization system by the application linked in via the standard interface.

The encryption of confidential data before transmission to a receiver is generally known. In what is known as the public encryption method the sender uses a public key of the authorized recipient for encryption of the data, so that only this recipient can decrypt the data with his own private key. The sender can authenticate the data by signing it. To do this the sender encrypts the data with his own private key while the recipient uses the sender's public key to decrypt the data. Data encrypted with public keys is not necessarily authentic whereas data signed with private keys is not confidential. To establish the confidentiality and authenticity data encryption and signing can thus be combined, to which end the sender first encrypts the data with his own private key and then with the recipient's public key. This is also possible with the method in accordance with the invention. Preferably however the calibration-required data is encrypted on the sender side with a private key and decrypted on the receiver side with the same private key. The private keys are integrated when the send device, for example a display module, and the receive device, in this case the visualization system, are manufactured. To finally guarantee the integrity, i.e. the incorruptibility of the transmitted data, the transmitter can determined the data from a check code which is sent encrypted to the recipient. The recipient decrypts the check code and compares the check code thus decrypted with the check code computed from the received data; if the two check codes are the same, the integrity of the data is ensured. To enable data coming from different senders to be displayed unmistakably on one and the same visualization system, the address of the relevant transmitter can be sent encrypted together with the data and subsequently visualized together with the associated data. Additionally combining the calibration-required data to be transmitted with a time stamp finally enables the currency of the data to be checked on receipt.

As already explained the calibration-required data is presented on the industry visualization system in a form which cannot be planned with the project planning software. This can occur in that the calibration-required data is visualized in a display area of the visualization system not accessible to the project planning software and thus reserved exclusively for display of the calibration-required data. Additionally or alternatively the calibration-required data can be visualized together with additional information which cannot be planned by the project planning software, for example a typical watermark in the background.

For further explanation of the method in accordance with the invention reference is made below to the single FIGURE of the drawing which shows part of an automation system.

BRIEF DESCRIPTION OF THE DRAWING

The sole FIGURE shows a part of an automation system.

DETAILED DESCRIPTION OF THE INVENTION

A process scale (weighing module) 1 is arranged in the automation system which communicates via a backplane bus 2 with of a CPU module 3 of the automation system. The CPU module 3 is connected just like an industry visualization system 4 to a field bus system 5, e.g. Profibus, of the automation system.

In the encapsulated weighing module 1 calibration-required weighing data generated by a weighing cell not shown in this diagram is combined with a designation of the weighing module 1, a time stamp (date, time of day), if necessary further parameters and a check code computed from this data to form a metadata record and is encrypted with a private key. This encrypted metadata record is transmitted via the backplane bus 2 to the CPU subassembly 3 and stored there together with unencrypted data in a memory. The unencrypted data can be weighing data of the weighing module, provided this weighing data is not intended for calibration-required applications, i.e. it is included for example for control purposes within the automation system.

To present the calibration-required weighing data the encrypted data set is transmitted via the unencapsulated field bus system 5 to the industry visualization system 4. This can be included in the project via a project planning interface by means of predetermined project planning software which allows specific presentations and forms of presentation. The industry visualization system 4 further features a standard interface for incorporating further applications into the industry visualization system 4, e.g. ActiveX-elements in this instance. Such ActiveX elements are used to decrypt the data record, with the same private key being used as in the weighing module 1. The ActiveX element, by comparing the decrypted check code with the check code computed from the received data, checks the integrity of the data and displays the weighing data and the designation of the associated weighing module 1 on a display 6 of the industry visualization system 4. In this case the data is presented in a form which could not be planned in the project planning software. This is done for example in a window 7 which cannot be covered by other windows and of which the background displays a unique watermark 8, e.g. fine wavy lines. The decrypted data is not available as internal variables, so that they can also not be modified and can be presented in the same way.

The invention claimed is:

1. A method for displaying calibration-required data by using an industry visualization system, wherein the visualization system can be planned via a project planning software, and wherein the visualization system has a standard interface for linking further applications, the method comprising:
transmitting the calibration-required data with its integrity safeguarded to the visualization system; and
visualizing the data in the visualization system by an application linked via the standard interface in a different form from the presentation options which can be planned via the project planning software, wherein the calibration-required data is visualized in a display area of the visualization system not accessible by the project planning software.

2. The method in accordance with claim 1, wherein the calibration-required data is transmitted encrypted, and wherein the calibration-required data is decrypted in the visualization system via the application linked via the standard interface.

3. The method in accordance with claim 2, wherein the calibration-required data is encrypted with a private key and decrypted with the same private key.

4. The method in accordance with claim 1, wherein the calibration-required data is visualized together with additional information that cannot be planned by the project planning software.

5. The method in accordance with claim 1, wherein the visualization system is projected by a predetermined project planning software.

6. A method for displaying calibration-required data by using an industry visualization system, wherein the visualization system can be planned via a project planning software, and wherein the visualization system has a standard interface for linking further applications, the method comprising:
transmitting the calibration-required data with its integrity safeguarded to the visualization system; and
visualizing the data in the visualization system by an application linked via the standard interface in a different form from the presentation options which can be planned via the project planning software, wherein the calibration-required data is visualized together with additional information that cannot be planned by the project planning software.

7. A method for displaying data subject to an obligatory calibration,
providing an industrial visualization system projected by a predetermined project planning software and having a standard interface for incorporating further applications;

transmitting the data to the visualization system by securing integrity of the data; and visualizing the data in the visualization system by an application incorporated via the standard interface in a different form from presentation options which can be projected by the project planning software, wherein the data is visualized in a display area of the visualization system not accessible to the project planning software.

8. The method in accordance with claim 7, wherein the data is transmitted encrypted and decrypted in the visualization system via the application incorporated via the standard interface.

9. The method in accordance with claim 8, wherein the data is encrypted with a private key and decrypted with the same private key.

10. A method for displaying data subject to an obligatory calibration, providing an industrial visualization system projected by a predetermined project planning software and having a standard interface for incorporating further applications;

transmitting the data to the visualization system by securing integrity of the data; and visualizing the data in the visualization system by an application incorporated via the standard interface in a different form from presentation options which can be projected by the project planning software, wherein the data is visualized together with additional information that cannot be projected via the project planning software.

* * * * *